May 1, 1945. R. M. NARDONE 2,374,829
TRANSMISSION
Original Filed Sept. 20, 1941 2 Sheets-Sheet 1

INVENTOR
Romeo M. Nardone
BY
Martin J. Finnegan
ATTORNEY

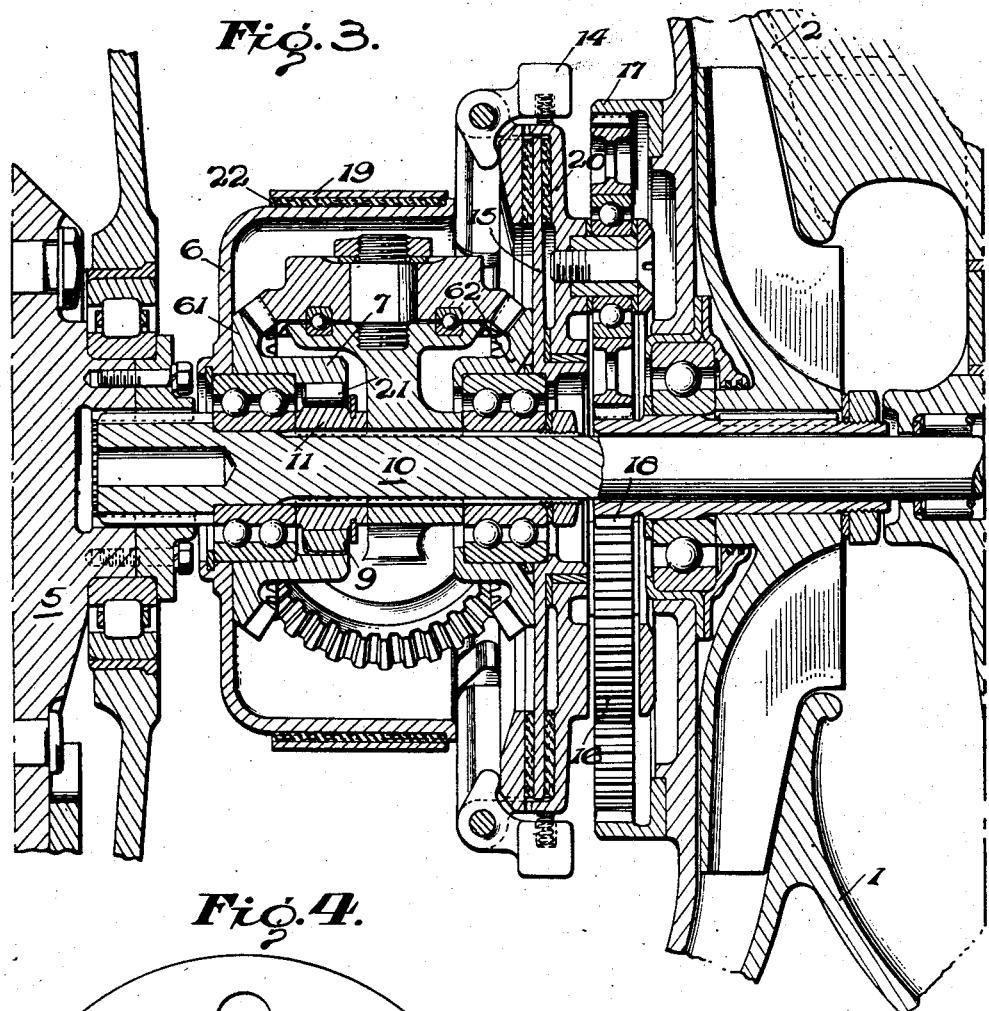

Patented May 1, 1945

2,374,829

UNITED STATES PATENT OFFICE 2,374,829

TRANSMISSION

Romeo M. Nardone, Westwood, N. J., assignor to Bendix Aviation Corporation, South Bend, Ind., a corporation of Delaware Original application September 20, 1941, Serial No. 411,747. Divided and this application October 12, 1942, Serial No. 461,759

1 Claim. (Cl. 74—288)

This invention relates to transmission systems and particularly to systems and devices for producing a variable speed drive.

An object of the invention is to provide a variable speed drive of novel construction.

Another object of the invention is to provide a novel drive including a friction clutch of the centrifugal type and also a friction brake by which the speed may be varied at will.

Still another object of the invention is to provide a novel, practical, efficient and compact construction which will be light in weight, relatively simple to manufacture and install, and readily accessible for inspection, removal, or replacement of parts.

Other objects and features of the invention will become apparent upon inspection of the following specification wherein is illustrated the preferred embodiment of the invention.

It is to be expressly understood, however, that the drawings are intended merely to serve the purpose of illustrating one mode of embodying the invention in practical form and are not to be considered as a definition of the limits of the invention, reference being had for this purpose to the appended claim.

In the accompanying drawings, wherein like reference characters refer to the corresponding parts throughout the several views—

Fig. 3 is a central sectional view of a modification;

Fig. 4 is a transverse view along line 4—4 of Fig. 1; and

Fig. 5 is an exploded perspective view of certain of the speed responsive elements.

Figure 1:
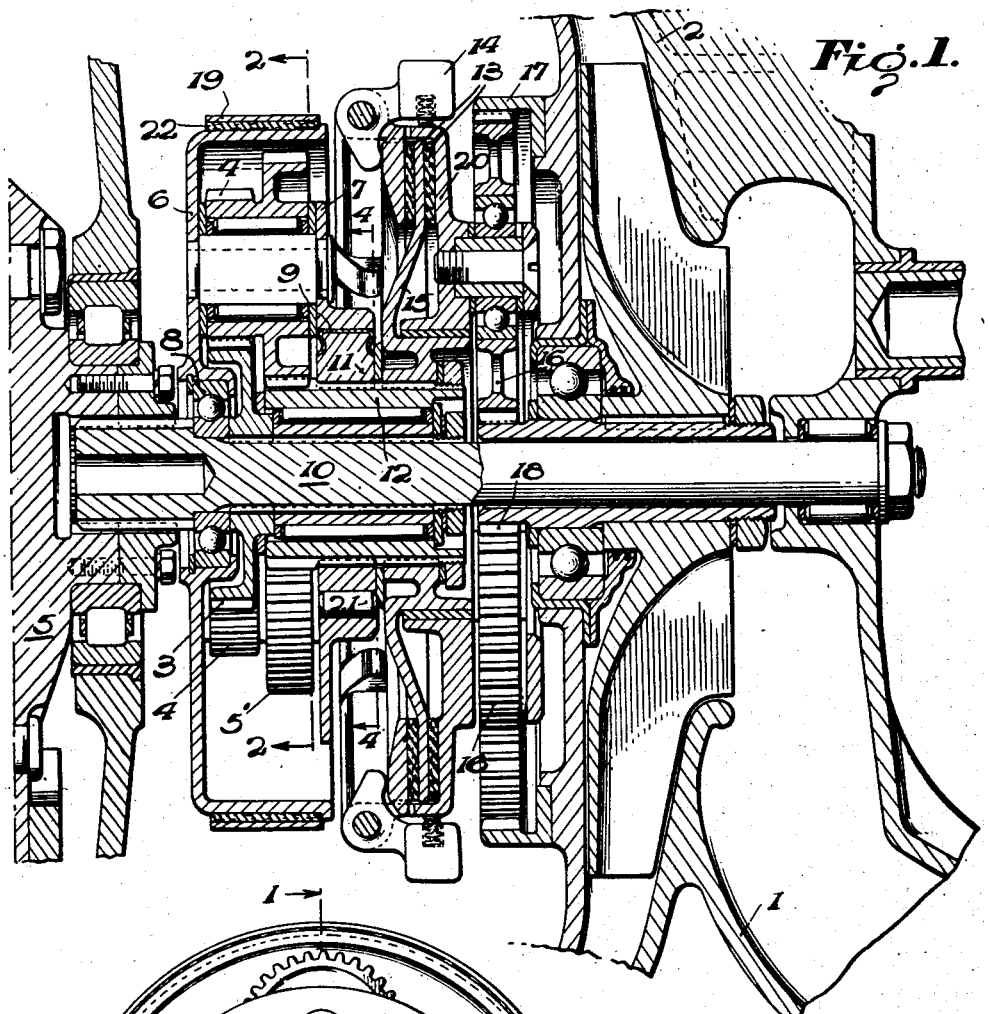
Fig. 1 is a central longitudinal sectional view of a structure embodying the invention.
Figure 2:
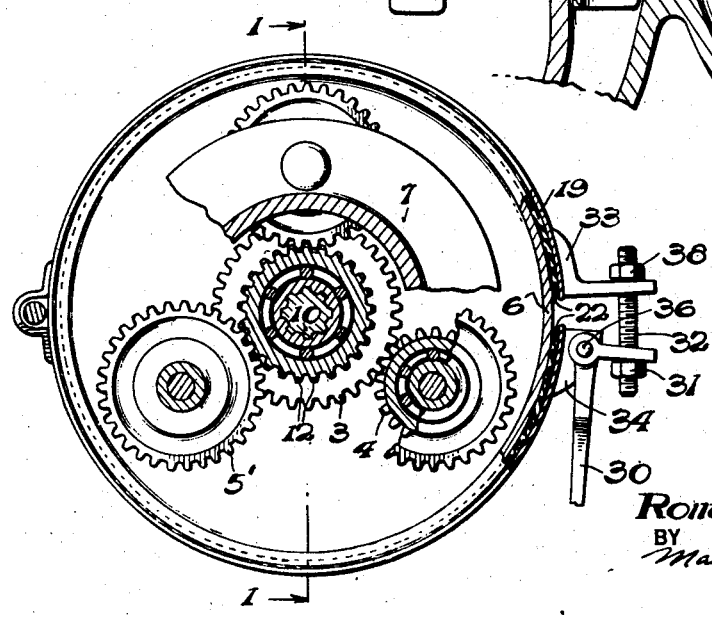
Fig. 2 is a transverse view, along line 2—2 of Fig. 1.

Referring to the drawings, the invention is shown as embodied in a supercharger assembly to which air is admitted through a suitable entrance member indicated at 1, the air being impelled through the radial channels formed by the impeller blades, and then passing by way of a suitable conduit 2, to the intake manifold of an internal combustion engine, having a crankshaft 5 to which is splined the accessory drive shaft 10. A gear 3 is splined and secured to shaft 10. This gear drives the planetary idler gears 4 formed integral with gears 5. These duplex planets are mounted on roller bearings supported between plates 6 and 7. Plate 6, forming part of a brake drum, is mounted on bearing 8, while plate 7, acting as an outer race of a roller type overrunning clutch, is supported on bronze shoes 9 on cam 11. Cam 11 and drive plate 15 are both splined and secured to gear 12 in mesh with gears 5.

A centrifugal clutch 13 having weights 14 forms part of the driven planetary spider 20, carrying gears 16. These gears mesh with stationary internal gear 17 and drive the blower pinion 18 at a high rate of speed.

When the spider formed by plates 6 and 7 is not held by the brake band 19, the rotation of shaft 10 and gear 3, with resistance at gear 12, tends to drive the spider assembly ahead of gear 12. This is prevented by the wedging of the rollers 21 of overrunning clutch 7—11; the wedging action occurring between plate 7 and the cam surfaces of inner race 11. Therefore no reduction in speed occurs and plate 15 is driven at crankshaft speed. Rotation of plate 15 is communicated to planetary carrier 20, as the pressure of engagement of the clutch plates is sufficient to meet normal requirements, even at minimum running speed of the crankshaft.

When the brake band (with shoes 22) is tightened on drum 6, the spider 6, 7 is held stationary and gears 4 and 5 rotate about their own axes while the roller clutch overruns. A 2-1 multiplication to the clutch plate 15 is obtained which, together with a final 6-1 multiplication at the planets 16, drives the blower at 12 times engine speed. When this occurs, weights 14 apply more pressure to the clutch assembly 13, 15, to render the drive more certain, while still protecting the gears in any emergency.

The tightening of brake band 19 may be effected by a conventional mechanism, such as a bell-crank 30 whose short end engages a nut 31 on an adjustable bolt 32. A pair of lugs 33, 34 are formed on the ends of brake band 19, and bell-crank 30 is pivotally mounted in one of these, as shown at 36. The lug 34 is adjustably held on bolt 32 by nut 38.

The roller clutch is shown best in Fig. 4, and a feature of novelty is the provision of the bronze (or other soft metallic) shoes 9 on the radial projections 41 on the inner race, or cam, 11. These shoes 9 facilitate free rolling of cam 11 when member 7 is held, and also act as bearings for the said member 7 at all times.

In Fig. 3 the operation is substantially the same, although differential gears are substituted for the planetary set 3, 4, 5, 12 of Fig. 1. Brake band 19 serves to hold gear 61 when tightened, thus causing acceleration of the drive to the gear 62, with which clutch plate 15 is integrated. When this occurs, inner clutch race 11 overruns outer race 7 which, in this embodiment, is integral with gear 61. Before application of the brake, gears 61 and 10 and clutch 21 rotate as a unit with shaft 10, as do the gears interposed therebetween; the drive being one-to-one.

This application is a division of my application No. 411,747, filed September 20, 1941, now Patent No. 2,301,072.

What is claimed is:

In combination, a centrifugally controlled friction clutch, a differential gear train having a plurality of elements, an overrunning roller clutch operatively associated with an element of said differential gear train, means responsive to restraint upon one element of the gear train to accelerate the drive, means responsive to release of said restraint to lock the roller clutch against free-wheeling, and means responsive to operation of said locking means for increasing the pressure on the centrifugally controlled friction clutch, said elements including at least a ternary of beveled gears with one of said gears being driven by another through the medium of the remaining gear.

ROMEO M. NARDONE.